(12) United States Patent
Kim et al.

(10) Patent No.: US 8,524,399 B2
(45) Date of Patent: Sep. 3, 2013

(54) NON-AQUEOUS ELECTROLYTE AND SECONDARY BATTERY COMPRISING THE SAME

(75) Inventors: Soojin Kim, Daejeon (KR); Jeong-Ju Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 541 days.

(21) Appl. No.: 12/672,789

(22) PCT Filed: Aug. 8, 2008

(86) PCT No.: PCT/KR2008/004619
§ 371 (c)(1),
(2), (4) Date: Sep. 21, 2010

(87) PCT Pub. No.: WO2009/020369
PCT Pub. Date: Feb. 12, 2009

(65) Prior Publication Data
US 2011/0183216 A1    Jul. 28, 2011

(30) Foreign Application Priority Data

Aug. 9, 2007 (KR) .................. 10-2007-0080360

(51) Int. Cl.
*H01M 6/18* (2006.01)
(52) U.S. Cl.
USPC ........... 429/307; 429/332; 429/330; 429/339; 429/340; 429/341; 429/342; 429/343; 429/199; 429/200; 429/231.1; 429/223; 252/62.2

(58) Field of Classification Search
USPC ............... 429/307, 332, 330, 339, 340, 341, 429/342, 343, 199, 200, 231.1, 231.3, 223; 252/62.2
See application file for complete search history.

(56) References Cited

U.S. PATENT DOCUMENTS

| | | | |
|---|---|---|---|
| 5,665,490 A * | 9/1997 | Takeuchi et al. | ............. 252/62.2 |
| 6,350,542 B1 | 2/2002 | Gan et al. | |
| 6,613,475 B2 | 9/2003 | Fauteux et al. | |
| 7,063,918 B2 * | 6/2006 | Kofinas et al. | ............. 429/317 |
| 2004/0170903 A1 | 9/2004 | Fukuoka et al. | |

FOREIGN PATENT DOCUMENTS

| | | |
|---|---|---|
| CN | 1554698 A | 12/2004 |
| JP | 58-92208 A | 6/1983 |
| JP | 62-11765 A | 1/1987 |
| JP | 3932511 B2 | 6/2007 |
| KR | 2001-0074419 A | 8/2001 |
| KR | 2001-0082428 A | 8/2001 |
| KR | 2002-95421 A | 12/2002 |
| WO | WO 2007/037650 A1 | 4/2007 |

OTHER PUBLICATIONS

Korean Office Action 10-2008-0077837 dated Jul. 29, 2010.

\* cited by examiner

*Primary Examiner* — Laura Weiner
(74) *Attorney, Agent, or Firm* — Birch, Stewart, Kolasch & Birch, LLP

(57) ABSTRACT

Disclosed is a non-aqueous electrolyte including an electrolyte salt and an electrolyte solvent, the non-aqueous electrolyte further including a compound containing both a carboxy group and a (meth)acrylic group, and a secondary battery including the non-aqueous electrolyte. The use of the compound containing both the carboxy group and the (meth) acrylic group as a component for an electrolyte significantly reduces the increase of battery thickness at high temperature storage.

14 Claims, 1 Drawing Sheet

NON-AQUEOUS ELECTROLYTE AND SECONDARY BATTERY COMPRISING THE SAME

TECHNICAL FIELD

The present invention relates to a non-aqueous electrolyte capable of significantly suppressing a thickness increase of a battery stored at high temperatures, and a secondary battery including the same.

BACKGROUND ART

Recently, there has been increasing interest in energy storage technology. Electrochemical devices have been widely used as energy sources in portable phones, camcorders, notebook computers, PCs and electric cars, resulting in intensive research and development. In this regard, electrochemical devices are subjects of great interest. Particularly, development of rechargeable secondary batteries has been the focus of attention. More recently, in the development of such batteries, active studies have been conducted to design a novel electrode and battery, which provide an improved capacity density and specific energy.

A secondary battery comprises a cathode, anode and an electrolyte. Such secondary batteries are capable of repeated charge/discharge cycles, because lithium ions deintercalated from a cathode active material upon the first charge cycle are intercalated into an anode active material (for example, carbon particles) and deintercalated again during a discharge cycle, so that lithium ions reciprocate between both electrodes while transferring energy.

Meanwhile, due to high reactivity of a lithium ion during initial charge of a secondary battery, the lithium ion, an electrolyte solvent, an anode active material, etc. may form a sort of SEI (Solid Electrolyte Interface) layer on the surface of the anode active material through a reaction. The SEI layer may prevent decomposition of an electrolyte at an anode surface during charge/discharge of a battery, or a structural collapse of an electrode, which is caused by the co-intercalation of an electrolyte solvent into an anode active material. However, an SEI layer formed by a conventional electrolyte solvent, for example, a carbonate-based organic solvent, is usually weak and porous, and thus is not enough to perform a role of a continuous protective layer for an anode. Especially, the SEI layer is not thermally stable, and thus is subject to break-down by electrochemical and thermal energy increased with the passage of time when a battery is driven or left at high temperatures. Accordingly, at high temperatures, the SEI layer may be re-formed, thereby reducing battery capacity. Also, a side reaction such as electrolyte decomposition may occur on an anode surface exposed by collapse of the SEI layer, and thus gas such as $CO_2$ may be generated, thereby causing a swelling phenomenon, that is, a thickness increase of a battery. This may cause a problem of safety deterioration in a product set employing a battery (such as a cellular phone, a notebook, etc.).

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
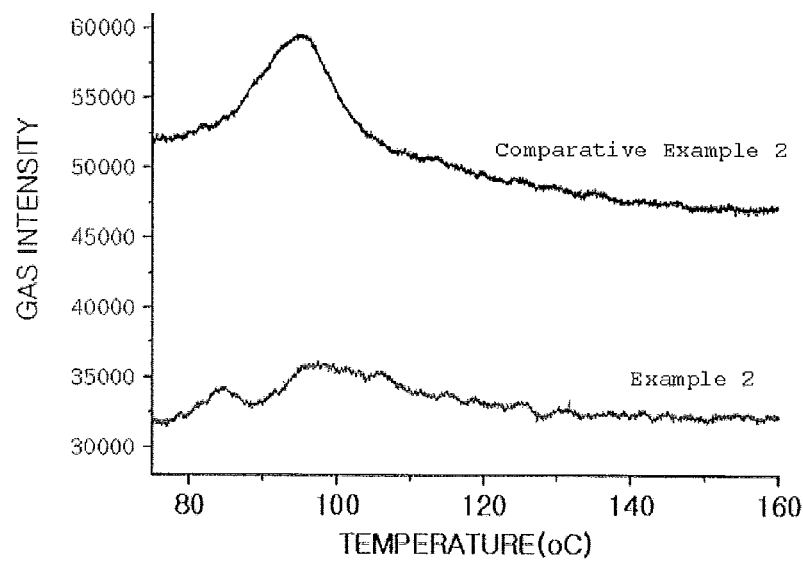
FIG. 1 is a graph showing the degree of gas generation at high temperature storage, which was measured on secondary batteries from Example 2 and Comparative Example 2 in Experimental Example 1.

The inventors of the present invention have found that the use of a compound containing both a carboxy group and a (meth)acrylic group as an electrolyte component significantly reduces a thickness increase of a battery at high temperature storage, and a combination of the compound and other electrolyte additives does not counterbalance or reduce the effect of the compound.

It is another object of the present invention to provide a non-aqueous electrolyte including the compound, and a secondary battery including the non-aqueous electrolyte.

According to an aspect of the present invention, there is provided a non-aqueous electrolyte including an electrolyte salt and an electrolyte solvent, which further includes a compound containing both a carboxy group and a (meth)acrylic group.

According to another aspect of the present invention, there is a secondary battery including a cathode, an anode, and the non-aqueous electrolyte.

Hereinafter, the present invention will be explained in more detail.

In order to improve the lifetime characteristic and high temperature performance of a conventional secondary battery, attempts to improve properties of an SEI layer formed on an anode surface by adding a certain compound to an electrolyte have been made. However, in most of them, it was impossible to improve all property items, or otherwise improvement of some property items caused degradation of other items. For example, the use of vinylene carbonate (VC) as an electrolyte additive improves the lifetime characteristic of a battery, while causing a problem in that thickness of the battery is significantly increased during high temperature storage due to thermal instability of a formed SEI layer.

Accordingly, the present invention is characterized by using a compound containing both a carboxy group and a (meth)acrylic group as an electrolyte additive capable of forming a thermally stable SEI layer on an anode surface.

The compound containing both the carboxy group and the (meth)acrylic group has been conventionally used as a component for a polymer type electrolyte. However, this is merely for improvement of mechanical properties through formation of a three dimensional network of a polymer electrolyte to be finally prepared.

On the other hand, in the present invention, the above mentioned compound containing both the carboxy group moiety and the (meth)acrylic group moiety is used as an electrolyte additive capable of forming a stable SEI layer on an anode surface.

The above mentioned additive includes the above mentioned polar moieties existing within a molecule. At the occurrence of reductive decomposition on an anode by charge, the polar moieties generate a thermally stable passivation layer through the formation of physical and/or chemical bonds therebetween, and thus may continuously exist during charge/discharge.

Also, since the above mentioned SEI layer has high stability in physical and thermal properties, it is possible to significantly suppress the occurrence of swelling phenomenon caused by the collapse of the SEI layer, even during continuous charge/discharge, or storage of a battery at high temperatures.

Furthermore, since the above mentioned SEI layer is not easily collapsed at high temperatures, a side reaction between an electrode surface and an electrolyte is reduced, thereby improving a capacity recovery rate after high temperature storage (recovered capacity after high temperature storage/capacity before high temperature storage). Also, the SEI layer is easily polarized due to its many oxygen atoms contained therein, and thus may facilitate the movement of lithium ions to an anode active material. Thus, it is possible to achieve improved various properties of a battery. The above description is noted in Tables 1 to 3.

There is no particular limitation in an electrolyte additive that may be used in the present invention, as long as the additive is a compound containing both a carboxy group and a (meth)acrylic group. The additive may be a compound represented by Formula 1.

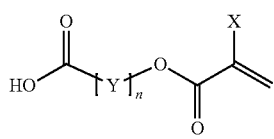

[Formula 1]

wherein X represents a hydrogen atom or a $CH_3$;

Y represents a $C_5$ alkyl group, or a $C_1$~$C_5$ haloalkyl group; and n is an integer of 1~5.

Herein, the $C_1$~$C_5$ haloalkyl group may be obtained by substituting a part of the alkyl group by at least one halogen element such as F, Cl, Br, I, etc.

Non-limiting examples of the electrolyte additive may include 2-carboxyethyl acrylate, 2-carboxyethyl methacrylate, carboxymethyl acrylate, carboxymethyl methacrylate, or a mixture thereof. Such electrolyte additive may be used alone or in combination.

The electrolyte additive may be included in an amount of 0.01 to 5 parts by weight based on 100 parts by weight of an electrolyte. If the content of the compound is less than 0.01 parts by weight, an inhibiting effect on battery swelling, according to the use of the compound, is insignificant. If the content is greater than 5 parts by weight, battery performance may be reduced by an irreversible increase of a reaction amount.

Meanwhile, the electrolyte additive of the present invention, that is, a compound containing both a carboxy group and a (meth)acrylic group, may be used in combination with other electrolyte additives in order to improve battery performance.

It can be seen that while a conventional swelling inhibitor when used in combination with other electrolyte additives counterbalances or reduces its effect, the electrolyte additive of the present invention when used in combination with other electrolyte additives can achieve a sufficient swelling inhibiting effect without counterbalancing or reducing the effect (see Table 1).

Non-limiting examples of electrolyte additives that may be used in combination with the electrolyte additive according to the present invention include vinyl group containing compounds, for example, vinylene carbonate, vinyl ethylene carbonate, fluoroethylene carbonate, difluoroethylene carbonate, etc.

A non-aqueous electrolyte of the present invention includes, in addition to a compound containing both a carboxy group and a (meth)acrylic group, a conventional electrolyte component known in the art, such as an electrolyte salt and an electrolyte solvent.

The electrolyte salt may include a combination of (i) a cation selected from the group including $Li^+$, $Na^+$, and $K^+$ and (ii) an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, but the present invention is not limited thereto. Such electrolyte salts may be used alone or in combination. Particularly, a lithium salt is preferred.

Examples of the electrolyte solvent may include cyclic carbonates, linear carbonates, lactones, ethers, esters, acetonitriles, lactams, ketones, etc.

Particular examples of the cyclic carbonates include ethylene carbonate (EC), propylene carbonate (PC), butylene carbonate (BC), fluoroethylene carbonate (FEC) or the like. Particular examples of the linear carbonates include diethyl carbonate (DEC), dimethyl carbonate (DMC), dipropyl carbonate (DPC), ethylmethyl carbonate (EMC), methyl propyl carbonate (MPC), or the like. Particular examples of the lactone include gamma-butyrolactone (GBL). Particular examples of the ether include dibutyl ether, tetrahydrofuran, 2-methyltetrahydrofuran, 1,4-dioxane, 1,2-dimethoxyethane, 1,2-diethoxyethane, or the like. Particular examples of the ester include methyl formate, ethyl formate, propyl formate, methyl acetate, ethyl acetate, propyl acetate, methyl propionate, ethyl propionate, butyl propionate, methyl pivalate, or the like. Also, examples of the lactam include N-methyl-2-pyrrolidone (NMP); and examples of the ketone include polymethylvinyl ketone. Also, halogen derivatives thereof may be used, and are not limited to the above exemplified electrolyte solvents. Such electrolyte solvents may be used alone or in combination.

Further, the present invention provides a secondary battery comprising a cathode, an anode, and the electrolyte as described above.

Non-limiting examples of the secondary battery include a lithium metal secondary battery, a lithium ion secondary battery, a lithium polymer secondary battery, or a lithium ion polymer secondary battery.

The secondary battery of the present invention may be manufactured by a conventional method known in the art. In one embodiment of such conventional methods, a separator is inserted between an anode and a cathode, and assembled, and an electrolyte prepared according to the present invention is injected.

Also, an electrode of the present invention may be manufactured by a conventional method known in the art. In one embodiment of such conventional methods, electrode slurry is prepared by mixing and agitating an electrode active material and a dispersion medium optionally with a binder, a conductive agent and a dispersant, and then the slurry is applied (coated) onto a metallic current collector, followed by compressing and drying.

Herein, as the electrode materials, such as a dispersion medium, a binder, a conductive agent, and a dispersant, any conventional materials known in the art may be used. The binder and the conductive agent may be used in an amount of 1 to 10 parts by weight and 1 to 30 parts by weight, respectively, based on 100 parts by weight of the electrode active material.

The electrode active materials may be used in a cathode active material and/or an anode active material of a conventional secondary battery may be used.

As the cathode active material, any type of cathode active material that may be used in a cathode of a conventional secondary battery may be used. Non-limiting examples of the cathode active material may include lithium-intercalating/deintercalating materials, such as a lithium transition metal composite oxide such as $LiM_xO_y$ (M=Co, Ni, Mn, $CO_aNi_b$-

Mn$_c$) (for example, lithium manganese composite oxide such as LiMn$_2$O$_4$, lithium nickel oxide such as LiNiO$_2$, lithium cobalt oxide such as LiCoO$_2$, oxides in which a part of transition metal such as Mn, Ni, Co is substituted with other transition metals, lithium containing vanadium oxide, etc), chalcogenide (for example, manganese dioxide, titanium disulfide, molybdenum disulfide, etc.), etc.

In particular, a conventional nickel-based cathode active material has high available capacity, but significantly increases thickness of a battery by generation of internal gas during charge/discharge due to its high reactivity with an electrolyte. On the other hand, in the present invention, it is possible to achieve high electric capacity without fear of an increase of battery thickness, even in combination with a nickel-based cathode active material, because the above described electrolyte additive can significantly inhibit a swelling phenomenon of a battery.

Non-limiting examples of the cathode active material containing nickel may include Li$_2$NiO$_2$, LiNi$_x$M$_{(1-x)}$O$_2$, Li$_2$Ni$_x$M$_{(1-x)}$O$_2$, LiNi$_{2x}$M$_{(2-2x)}$O$_4$ (0<x≦1; M is at least one component selected from the group consisting of Al, Mn, Co, Fe, Cu, Zn, Mg and Cd) or a mixture thereof.

As the anode active material, any type of anode active material that may be used in an anode of a conventional secondary battery may be used. Non-limiting examples of the anode active material may include lithium-absorbing/discharging materials, such as lithium metal, lithium alloy, carbon, petroleum coke, activated carbon, graphite, carbon fiber, etc. In addition, a metal oxide, such as TiO$_2$, SnO$_2$, etc., which can intercalate (insert) and deintercalate lithium ions and has a potential vs. lithium potential of less than 2V may be used. Particularly, a carbonaceous material, such as graphite, carbon fiber, activated carbon, etc. is preferred.

There is no particular limitation in the separator that may be used in the present invention, as long as the separator is a porous material that serves to interrupt an internal short circuit in both electrodes and is impregnated with an electrolyte. Non-limiting examples of the separator that may be used include a polypropylene-based, polyethylene-based, or polyolefin-based porous separator.

There is no particular limitation in the outer shape of the secondary battery. The secondary battery may be a cylindrical battery using a can, a prismatic battery, a pouch-type battery or a coin-type battery.

BEST MODE FOR CARRYING OUT THE INVENTION

Reference will now be made in detail to the preferred embodiments of the present invention. However, the following examples are illustrative only, and the scope of the present invention is not limited thereto.

Example 1

Based on 100 parts by weight of 1M LiPF$_6$ solution (ethylene carbonate (EC): ethyl methyl carbonate (EMC)=1:2 in a volume ratio), 0.5 parts by weight of 2-carboxyethyl acrylate was added to prepare an electrolyte.

The electrolyte, LiCoO$_2$ as a cathode active material, and artificial graphite as an anode active material were used to provide a secondary battery in a conventional manner.

Example 2

An electrolyte and a secondary battery were manufactured in the same manner as described in Example 1, except that 1 part by weight of vinylene carbonate was further added as an electrolyte additive capable of improving a battery lifetime.

Comparative Example 1

An electrolyte and a secondary battery were manufactured in the same manner as described in Example 1, except that 3 parts by weight of 1,3-propane sultone as a conventional swelling inhibitor and 1 part by weight of vinylene carbonate were used, instead of 0.5 parts by weight of 2-carboxyethyl acrylate.

Comparative Example 2

An electrolyte and a secondary battery were manufactured in the same manner as described in Example 1, except that 1 part by weight of vinylene carbonate was used, instead of 0.5 parts by weight of 2-carboxyethyl acrylate.

Experimental Example 1

Comparison of the Degree of Gas Generation at High Temperature Storage

Each of the secondary batteries obtained from Example 2 and Comparative Example 2 was charged to 4.2V at constant voltage/constant current of 1 C-rate under a condition of 50 mA cut-off at 25□, and then was discharged to 3.0V at constant current of 1.0 C-rate. This charge/discharge was carried out three times. Then, the battery in a discharged state was disassembled and its anode was collected. On the anode, the degree of gas generation according to an increase of temperature was measured. FIG. 1 shows the results. Herein, the gas generation is generally assumed to be caused by thermal breakdown of an SEI layer formed on an anode surface.

As a result, the battery obtained from Comparative Example 2, which used a conventional electrolyte additive (i.e., vinylene carbonate), showed a high degree of gas generation about 100° C. On the other hand, the battery obtained from Example 2 showed an insignificant change in degrees of gas generation. Also, the battery according to the present invention, which was obtained from Example 1, showed a total gas generation degree about 1.5 times lower than that of the battery obtained from Comparative Example 2.

Accordingly, it is assumed that the use of the compound according to the present invention as an electrolyte component, the compound containing both a carboxy group and a (meth)acrylic group, may allow a thermally stable SEI layer to be formed on the surface of an anode.

Experimental Example 2

Comparison of Change in Thickness at High Temperature Storage

Each of the secondary batteries obtained from Examples 1 and 2 and Comparative Examples 1 and 2 was fully charged to 4.2V at constant voltage/constant current of 1 C-rate under a condition of 50 mA cut-off at 25□, Then, the temperature of the battery was raised from 25□ up to 90° C. for 1 hour, and then was maintained at 90° C. for 4 hours. Then, during the high temperature storage, the change in battery thickness was measured according to the temperature by lowering the temperature at 90° C. for 1 hour.

Figure 2:
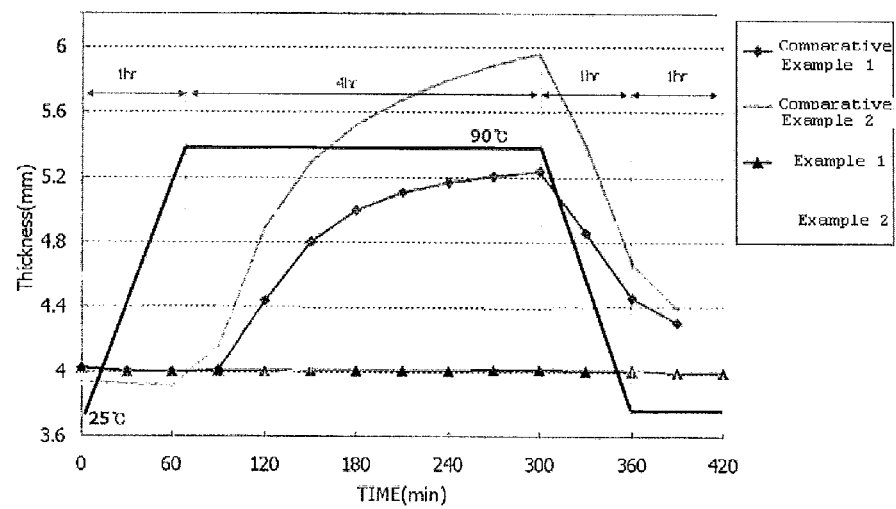
FIG. 2 is a graph showing a change in thickness at high temperature storage, which was measured on secondary batteries from Examples 1 and 2 and Comparative Examples 1 and 2 in Experimental Example 2.

The experimental results are shown in FIG. 2 and Table 1 (herein, the change value in battery thickness=maximum battery thickness−initial battery thickness).

As a result, in the case of the battery from Comparative Example 2, in which a conventional electrolyte additive (i.e., vinylene carbonate) was used, the thickness significantly increased after high temperature storage. Also, even when a conventional swelling inhibitor (1,3-propane sultone) was further used, the decreased rate of thickness was merely about 40%.

On the other hand, when an electrolyte additive according to the present invention, that is, 2-carboxyethyl acrylate, was used, thickness was hardly changed after high temperature storage. Furthermore, when the electrolyte additive was used in combination with a conventional electrolyte additive (vinylene carbonate), the increased rate of thickness was highly insignificant.

It can be seen from the above experimental results that when a compound according to the present invention, the compound containing both a carboxy group and a (meth) acrylic group, is used as an electrolyte component, it is possible to achieve an excellent swelling inhibiting effect.

TABLE 1

|  | Electrolyte additive | Thickness change (mm) |
|---|---|---|
| Exp. 1 | 2-carboxyethyl acrylate | −0.012 |
| Exp. 2 | 2-carboxyethyl acrylate Vinylene carbonate | 0.205 |
| Comp. Exp. 1 | Vinylene carbonate 1,3-propane sultone | 1.207 |
| Comp. Exp. 2 | Vinylene carbonate | 2.019 |

Experimental Example 3

Property at High Temperature Storage

The battery stored at high temperatures as described in Example 2 was discharged to 3.0V at constant current of 1.0 C-rate at 25° C. to determine the residual capacity of the battery. Then, after charge/discharge was carried out three times at 25° C., discharge capacity (recovery capacity) after 3 cycles was measured. Table 2 shows the measured results. Herein, capacity recovery rate after high temperature storage was calculated by recovery capacity after high temperature storage/discharge capacity before high temperature storage.

As a result, the batteries from Examples 1 and 2, in which 2-carboxyethyl acrylate was used as an electrolyte additive, showed an excellent capacity recovery rate after high temperature storage.

It can be seen from the above experimental results that when a compound according to the present invention, the compound containing both a carboxy group and a (meth) acrylic group, is used as an electrolyte component, an SEI layer having high thermal stability is formed on the anode surface, thereby reducing a side reaction between an electrode surface and an electrolyte.

TABLE 2

|  | Electrolyte additive | Before high temperature storage Discharge capacity | After high temperature storage | | |
|---|---|---|---|---|---|
|  |  |  | Residual capacity | Recovery capacity | Capacity recovery rate |
| Exp. 1 | 2-carboxyethyl acrylate | 759 | 746 | 756 | 99.7 |
| Exp. 2 | 2-carboxyethyl acrylate Vinylene carbonate | 801 | 773 | 783 | 97.8 |
| Comp. Exp. 1 | Vinylene carbonate 1,3-propane sultone | 793 | 703 | 689 | 86.9 |
| Comp. Exp. 2 | Vinylene carbonate | 811 | 778 | 770 | 94.9 |

Experimental Example 4

Performance Test on a Secondary Battery

Each of the secondary batteries obtained from Example 2 and Comparative Example 2 was charged to 4.2V at constant voltage/constant current of 1.0 C-rate under a condition of 50 mA cut-off at 25□, and then was discharged to 3.0V at constant current of 0.5 C-rate. Also, through charge under the same condition as described above, discharge to 3.0V at constant current of 1.0 C-rate was carried out. Table 3 shows the measured discharge capacity. Herein, the rate of discharge capacity may be used as a measurement basis for high-rate capability of a battery.

Also, each of batteries obtained from Examples 1 and 2 and Comparative Examples 1 and 2 was subjected to charge/discharge 350 times at 25° C. at 1.0 C-rate/1.0-rate in the same manner as described above in order to measure the lifetime characteristics of the batteries. Table 3 shows the results.

As a result, the battery from Example 2, in which 2-carboxyethyl acrylate was used in combination with vinylene carbonate, as an electrolyte additive, showed similar performance to the battery obtained from Comparative Example 2 in which vinylene carbonate was used alone, from the standpoint of high-rate capability and lifetime characteristic.

It can be seen from the above experimental results that when a compound according to the present invention, the compound containing both a carboxy group and a (meth) acrylic group, is used in combination with other electrolyte additives, the effect of the compound is not counterbalanced or reduced.

TABLE 3

|  | High-rate capability | | | Lifetime characteristic | |
|---|---|---|---|---|---|
|  |  |  | Discharge capacity rate | Capacity | |
|  | 0.5 C | 1.0 C |  | initial | after charge/ discharge | Capacity maintenance rate |
| Exp. 2 | 821 | 801 | 97.6 | 801 | 648 | 81 |
| Comp. Exp. 2 | 822 | 811 | 98.7 | 811 | 646 | 80 |

INDUSTRIAL APPLICABILITY

As can be seen from the foregoing, since a compound containing both a carboxy group and a (meth)acrylic group is used as an electrolyte component, a thickness increase of a battery at high temperature storage may be significantly reduced. Especially, even when the electrolyte additive of the present invention is used in combination with other electrolyte additives, a swelling inhibition effect can be sufficiently achieved, without being counterbalanced or reduced.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A non-aqueous electrolyte comprising an electrolyte salt and an electrolyte solvent,
    which further comprises a compound containing both a carboxy group and a (meth)acrylic group represented by Formula 1:

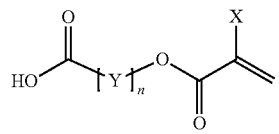

[Formula 1]

wherein X represents H or CH$_3$;
Y represents C$_1$-C$_5$ alkyl group, or C$_1$-C$_5$ haloalkyl group, S, N, or SiO; and
n is an integer of 1-5.

2. The non-aqueous electrolyte as claimed in claim 1, wherein the compound containing both the carboxy group and the (meth)acrylic group comprises at least one compound selected from the group including 2-carboxyethyl acrylate, 2-carboxyethyl methacrylate, carboxymethyl acrylate, and carboxymethyl methacrylate.

3. The non-aqueous electrolyte as claimed in claim 1, wherein the compound containing both the carboxy group and the (meth)acrylic group is included in an amount of 0.01 to 5 parts by weight based on 100 parts by weight of the non-aqueous electrolyte.

4. The non-aqueous electrolyte as claimed in claim 1, which further comprises a compound having a vinyl group.

5. The non-aqueous electrolyte as claimed in claim 4, wherein the compound having the vinyl group comprises at least one compound selected from the group including vinylene carbonate, vinylethylene carbonate, fluoroethyl carbonate, and difluoroethyl carbonate.

6. The non-aqueous electrolyte as claimed in claim 1, wherein the electrolyte salt comprises a combination of:
    (i) a cation selected from the group including Li$^+$, Na$^+$, and K$^+$; and
    (ii) an anion selected from the group consisting of PF$_6^-$, BF$_4^-$, Cl$^-$, Br$^-$, I$^-$, ClO$_4^-$, AsF$_6^-$, CH$_3$CO$_2^-$, CF$_3$SO$_3^-$, N(CF$_3$SO$_2$)$_2^-$, and C(CF$_2$SO$_2$)$_3^-$.

7. The non-aqueous electrolyte as claimed in claim 1, wherein the electrolyte solvent comprises at least one compound selected from the group including cyclic carbonates, linear carbonates, lactones, ethers, esters, sulfoxides, acetonitriles, lactams, and ketones, in which halogen is introduced or unintroduced.

8. A secondary battery comprising a cathode, an anode, and the non-aqueous electrolyte as claimed in claim 1, wherein the non-aqueous electrolyte comprises an electrolyte salt, an electrolyte solvent, and a compound containing both a carboxy group and a (meth)acrylic group represented by Formula 1:

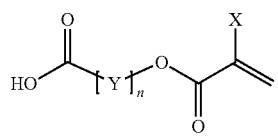

[Formula 1]

wherein X represents H or CH$_3$;
Y represents a C$_1$-C$_5$ alkyl group, a C$_1$-C$_5$ haloalkyl group, S, N, or SiO; and
n is an integer of 1-5; and
wherein the cathode comprises lithium transition metal composite oxide as a cathode active material.

9. The secondary battery as claimed in claim 8, wherein the compound containing both the carboxy group and the (meth)acrylic group comprises at least one compound selected from the group including 2-carboxyethyl acrylate, 2-carboxyethyl methacrylate, carboxymethyl acrylate, and carboxymethyl methacrylate.

10. The secondary battery as claimed in claim 8, wherein the compound containing both the carboxy group and the (meth)acrylic group is included in an amount of 0.01 to 5 parts by weight based on 100 parts by weight of the non-aqueous electrolyte.

11. The secondary battery as claimed in claim 8, wherein the non-aqueous electrolyte further comprises a compound having a vinyl group.

12. The secondary battery as claimed in claim 11, wherein the compound having the vinyl group comprises at least one compound selected from the group including vinylene carbonate, vinylethylene carbonate, fluoroethyl carbonate, and difluoroethyl carbonate.

13. The secondary battery as claimed in claim 8, wherein the cathode comprises a Ni-based cathode active material in combination with the lithium transition metal composite oxide.

14. The secondary battery as claimed in claim 13, wherein the Ni-based cathode active material is at least one material selected from the group including LiNi$_x$M$_{(1-x)}$O$_2$, Li$_2$Ni$_x$M$_{(1-x)}$O$_2$ and LiNi$_{2x}$M$_{(2-2x)}$O$_4$ (herein, 0≦x≦1, M comprises at least one material selected from the group including Al, Mn, Co, Fe, Cu, Zn, Mg and Cd).

* * * * *